Sept. 9, 1958     L. S. GREENLAND ET AL     2,851,230
MACH NUMBER RESPONSIVE CONTROL FOR AIRCRAFT FUEL SYSTEM
Filed Jan. 5, 1954     2 Sheets-Sheet 1

Sept. 9, 1958 L. S. GREENLAND ET AL 2,851,230
MACH NUMBER RESPONSIVE CONTROL FOR AIRCRAFT FUEL SYSTEM
Filed Jan. 5, 1954 2 Sheets-Sheet 2

United States Patent Office 2,851,230
Patented Sept. 9, 1958

2,851,230

MACH NUMBER RESPONSIVE CONTROL FOR AIRCRAFT FUEL SYSTEM

Leonard Sidney Greenland, Compton, and Kenneth Aubrey Stenning, Oxley, Wolverhampton, England, assignors to H. M. Hobson Limited, London, England, a British company Application January 5, 1954, Serial No. 402,355

Claims priority, application Great Britain January 5, 1953

6 Claims. (Cl. 244—76)

This invention relates to a fuel supply system for an airborne vehicle propelled by an engine, and has for its object to provide means for preventing the Mach number of the vehicle from exceeding a predetermined value.

The fuel supply system according to the invention comprises an air/fuel ratio control unit, a conduit for applying to said unit a gas pressure signal equivalent for all conditions of flight to the ram pressure at the entry of the air duct to the engine, said unit being effective to maintain the rate of flow of fuel proportional to said gas pressure signal, and a Mach number control unit in said conduit which operates, when the Mach number reaches a predetermined value, to modify the gas pressure signal in the sense to reduce the fuel flow to the engine.

Preferably the Mach number control unit comprises a valve which normally closes a control orifice in the conduit, and pressure sensitive means, responsive conjointly to signal pressure and to atmospheric pressure, arranged to move the valve to open the control orifice, and thereby to reduce the signal pressure, when a predetermined Mach number is attained. Thus in one embodiment of the invention, the Mach number control unit comprises a pivoted lever for controlling the valve, and a pair of bellows coacting with the lever and both subject externally to static atmospheric pressure, one bellows being evacuated and the other being exposed internally to the signal pressure, the evacuated bellows normally holding the valve closed and the other bellows serving to move the valve to open the control orifice when the predetermined Mach number is attained.

In another embodiment, the valve is biased to the closed position by two bellows, disposed co-axially one within the other, the outer bellows being evacuated and the inner bellows being exposed internally to the signal pressure and both bellows being subject externally to static atmospheric pressure.

Figure 1:
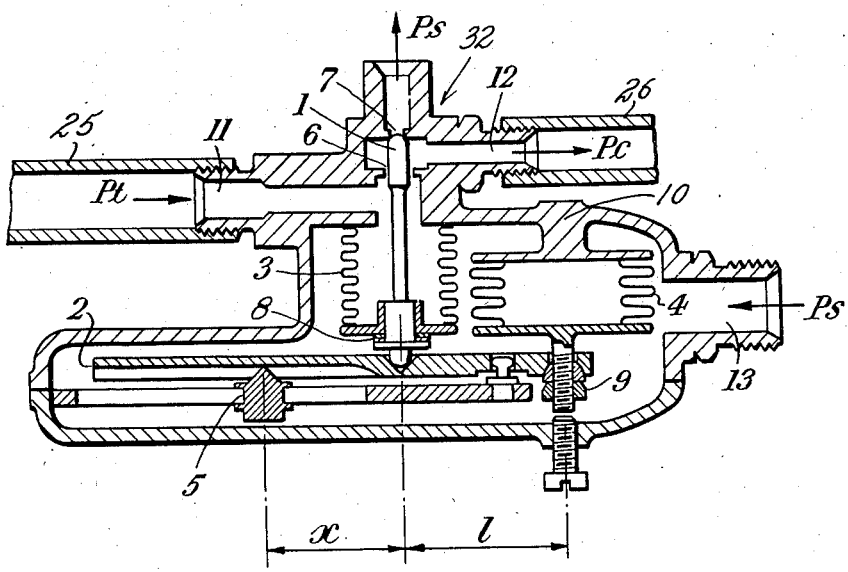
Figure 2:
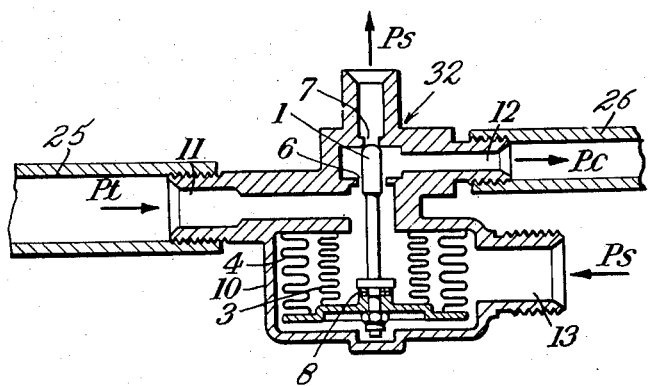
Figure 3:
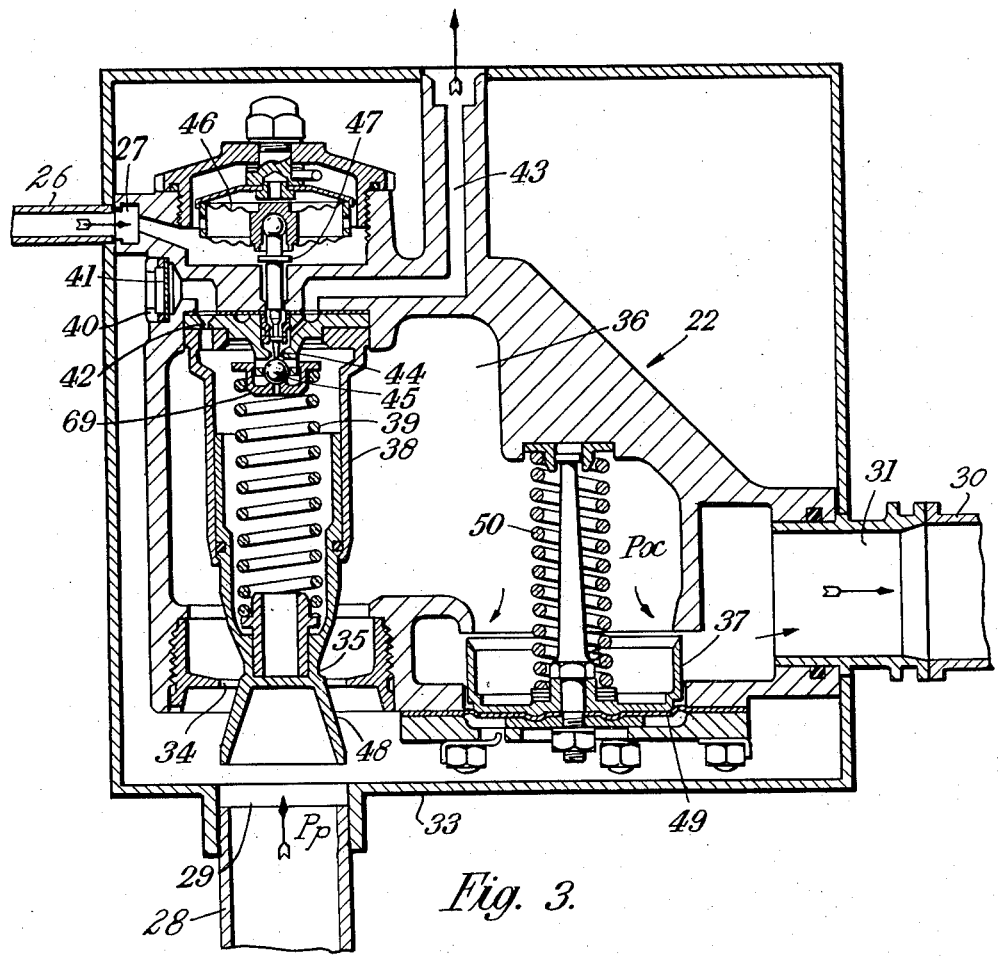
Figure 4:
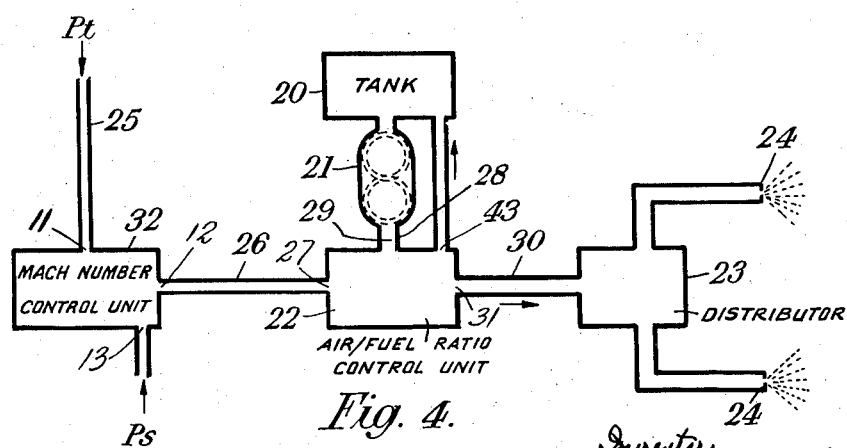

The invention will now be described in more detail, by way of example, with reference to the drawings in which:

Fig. 1 is a diagrammatic sectional view showing one form of Mach number control unit, Fig. 2 is a similar view of an alternative form of Mach number control unit, Fig. 3 is a sectional view showing the air/fuel ratio control unit, and Fig. 4 is a block diagram.

As shown in Fig. 4, fuel is pumped from a tank 20 by a pump 21 to an air/fuel ratio control unit 22 (shown in detail in Fig. 3) and thence, via a distributor 23, to the burners 24 of a combustion turbine or ram jet engine. The air/fuel ratio control unit 22 serves to meter the fuel supplied to the burners 24 in accordance with changes in ram pressure at the entry of the air duct to the engine, this pressure being supplied to the unit 22 by a conduit 25, 26 (Fig. 4), the conduit 26 being connected to the inlet 27 (Fig. 3) of the unit 22, the pipe 28 (Fig. 4), by which fuel is supplied from the pump 21, being connected to an inlet 29 (Fig. 3) in the casing 33 of the unit 22 and the fuel delivery pipe 30 (Fig. 4), by which fuel is delivered to the distributor 23, being connected to the outlet 31 (Fig. 3) of the unit 22.

Between the conduit sections 25, 26 (Fig. 4) is disposed a Mach number control unit 32, of the kind shown either in Fig. 1 or Fig. 2. The unit 32 is ineffective at low Mach numbers but serves, as later described, at high Mach numbers to modify the gas pressure signal applied to the unit 22 in the sense to reduce the fuel flow to the engine.

Turning now to Fig. 3, the fuel entering the inlet 29 of the air/fuel ratio control unit 22 passes through a metering orifice 34, controlled by a metering valve 35, to a chamber 36 and thence, through a pressure regulating valve 37, to the outlet 31 leading to the distributor. The metering valve 35 is mounted to slide in a housing 38 and a spring 39, mounted in compression between the valve 35 and a retainer 69, tends to open the valve 35. This action is assisted by the pressure of fuel within the housing 38 and opposed by the delivery pressure of the pump 21, $P_p$, acting on the undersurface of the valve 35. Fuel enters the housing 38 through an inlet 40, provided with a filter 41, and a restricted orifice 42, and escapes from the housing 38 to a spill line 43 through an orifice 44 controlled by a ball valve 45. A diaphragm 46, subject to the gas pressure at the inlet 27, has an inherent spring load, opposed by the gas pressure and tending to open the ball valve 45 through the agency of a needle 47. The load of the spring 39, acting through the retainer 69, tends to close the ball valve. The ball valve 45 is always slightly open as shown in Fig. 3 and the unit responds as follows to changes in the gas pressure at the inlet 27:

If the gas pressure decreases, the diaphragm 46 will increase the opening of the ball valve 45, so reducing the fuel pressure in the housing 38. The metering valve 35 will consequently rise to decrease the fuel flow, so increasing the compression of the spring 39 and closing the ball valve 45 slightly until the fuel pressure in the housing 38 is such as to maintain the metering valve 35 in equilibrium in its new position. The reverse action takes place on increase in the gas pressure. The ball valve 45 will then close slightly increasing the fuel pressure in the housing 38 and moving the metering valve 35 down to increase the fuel flow. The resulting reduction in load on the spring 39 allows the ball valve 45 to open slightly until the fuel pressure in the housing is reduced to a value at which the metering valve 35 will be maintained in equilibrium. The arrangement is such that the displacement of the metering valve 35 is proportional to the gas pressure at the inlet 27. The contour of the head 48 of the valve is such that the rate of flow of fuel through the metering orifice 34 is proportional to the displacement of the valve and therefore to the gas pressure acting on the diaphragm 46.

The pressure regulating valve 37 is attached to a diaphragm 49, subject at its undersurface to the delivery pressure $P_p$ of the pump and at its upper surface to the hydraulic pressure $P_x$ prevailing in the chamber 36 and to the pressure of a spring 50. The load of the spring 50 is such that the valve 37 will assume a position such that $P_p - P_x$, i. e. the pressure drop across the metering orifice 34, has a predetermined value, e. g. 35 p. s. i. Any variation in this pressure drop will cause the valve 37 to move in the direction required to return the pressure drop to the above-noted value.

The Mach number control unit shown in Fig. 1 comprises a casing 10, having an inlet 11 for receiving from the conduit 25 (Fig. 4) the signal pressure $P_t$ (i. e. the ram pressure at the air intake to the combustion chamber of the engine), and an outlet 12 for applying, via the conduit 26 (Fig. 4) a gas pressure $Pc$ to the air/fuel ratio control unit 22. A valve 1 normally closes a control orifice 7 and is disposed within a fixed restriction 6. So long as the valve 1 is closed, $Pc$ is equal to $Pt$. Within the casing 10 are two bellows 3, 4 which coact with a lever 2 pivoted on a fulcrum 5 and bearing against the stem of the valve 1. Both bellows are subject externally to static atmospheric pressure $Ps$, applied at an inlet 13.

The bellows 4 is evacuated and has a screw threaded extension which is attached to the lever 2 by an adjustable nut 9. The bellows 3 is subject internally to the pressure $Pt$ and a shim 8 is disposed between the bellows 3 and the lever 2. The shim 8 and adjustable nut 9 ensure that when the valve 1 is closed, the forces exerted on the lever 2 as the result of the spring rates of the bellows 3 and 4 are balanced.

At sea level static conditions, the pressure on both sides of the pressurised bellows 3 is atmospheric and the force exerted by this unit on the lever 2 is therefore zero. Due however to the atmospheric pressure $Ps$ acting upon the end of the evacuated bellows 4 adajcent to the lever 2, a resulting force acts on the lever 2 to close the valve 1.

At any given altitude the force transmitted to the lever 2 by the evacuated bellows 4 will be constant and tends to seat the valve. As the vehicle velocity increases, the Mach number increases and the pressure $Pt$ is a function of the Mach number. The force exerted on the lever 2 by the pressurised bellows 3 accordingly increases with Mach number. This force tends to open the valve 1. At some Mach number the algebraic sum of the moments about the fulcrum 5 transmitted to the lever 2 by the bellows 3, 4 will be zero. This is the Mach number at which the valve 1 is on the point of opening and is defined as the "control operative" point.

Since, before the valve 1 opens, the forces exerted on the lever 2 as the result of the spring rates of the bellows 3, 4 are balanced, the point at which the valve commences to open depends only upon the gas pressures $Ps$ and $Pt$, and the valve 1 will open at the same Mach number at any altitude. The Mach number at which valve opening commences can be varied by moving the fulcrum 5 to adjust the distance $x$.

The ratio of the pressures $$\frac{Pt}{Ps}$$

is a unique function of the Mach number and is therefore independent of altitude. The unit is so designed that the valve 1 will open at a selected value of the ratio $$\frac{Pt}{Ps}$$

The downward moment exerted by the bellows 3 about the fulcrum 5 is $(Pt-Ps)x$ and the upward moment exerted by the bellows 4 about the fulcrum 5 is $Ps(l+x)$. At the control operative point these two moments are equal, i. e.

$$\frac{Pt}{Ps}=\frac{l+2x}{x}$$

The Mach number at which valve opening commences is thus independent of altitude and defined solely in terms of the distances $x$ and $l$.

The valve having commenced to open, the valve lift will increase until the unbalanced moments about the fulcrum 5 are equalised by the increasing tension forces generated by the bellows 3, 4 as the lever 2 extends them.

On the valve 1 being opened, gas is allowed to escape from the air/fuel ratio signal circuit. This establishes a gas flow through the fixed restriction 6 and the valve control orifice 7.

When this flow is set up, a pressure drop occurs over the restriction 6 and over the control orifice 7. The resultant pressure $Pc$ of the gas between the restriction 6 and the control orifice 7 will be a function of the relative flow areas at these points and of $Pt$. The pressure $Pc$ is applied to the air/fuel ratio control and evidently, for a given $Pt$, $Pc$ will decrease as the valve is opened.

With increase of vehicle Mach number above the control operative point, the percentage of generated signal pressure which is applied to the air/fuel ratio control unit 22 is thus progressively diminished from 100%. A corresponding decrease of fuel flow is effected by the air/fuel ratio control unit 22 which leads to a reduction in the engine propulsive thrust and so ensures that the required limiting Mach number is not exceeded.

The arrangement shown in Fig. 2 differs from that in Fig. 1 in that the lever 2 is omitted and the bellows 3 and 4 are disposed co-axially one within the other. If then A3 is the effective area of the inner bellows 3 and A4 that of the outer bellows 4, the upward force exerted on the valve 1 by the bellows 4 will be $PsA4$ while the downward force exerted on the valve by the bellows 3 will be $PtA3$.

The Mach number defining the control operative point thus corresponds to a value of $$\frac{Pt}{Ps}$$

equal to $$\frac{A4}{A3}$$

i. e. the ratio of the effective areas of the bellows.

What we claim as our invention and desire to secure by Letters Patent is:

1. A Mach number control unit for use in airborne vehicles comprising a casing having two sections separated by a wall of said casing, one section affording a passage for gas under pressure from a pressure gas inlet in said casing to a gas pressure outlet in said casing and the other section being subject internally to atmospheric pressure, first and second bellows in said other section, the first bellows being subject internally to the gas pressure in said passage through an aperture in said wall and the second bellows being evacuated, a control orifice in said passage communicating with the atmosphere, a valve normally closing said control orifice, and means connecting both of said bellows to said valve and applying to said valve from said second bellows a force tending to close it and from said first bellows a force tending to open it which increases with the gas pressure in said passage.

2. A control unit according to claim 1, wherein said bellows are disposed coaxially with the second bellows surrounding said first bellows and wherein said connecting means is constituted by a valve stem attached to both said bellows.

3. A control unit according to claim 1, wherein said connecting means comprises a valve stem attached to the interior of the first bellows and a pivoted lever contacting at spaced points the exterior surface of both said bellows.

4. The combination, with the engine of an airborne vehicle, of a fuel pump, a fuel conduit for supplying fuel from said pump to said engine, a metering valve controlling a metering orifice in said conduit, an open-ended gas conduit for passage of air at ram pressure, a device responsive to the pressure of the air in said gas conduit and coupled to said metering valve, said pressure responsive device controlling said metering valve to maintain the flow of fuel to the engine proportional to the air pressure in said gas conduit, an orifice for bleeding gas from said gas conduit, a valve normally closing said orifice, a device responsive to Mach number and means operated thereby to open said valve when the Mach number attains a predetermined value.

5. A combination according to claim 4, wherein said device responsive to Mach number comprises first and second bellows both subject externally to atmospheric pressure, said second bellows being evacuated, and a passage affording communication between the gas conduit and the interior of said first bellows, and wherein said valve-opening means connects both bellows to said valve and is subjected by the second bellows to a force tending to close the valve and by the first bellows to a force tending to open the valve.

6. A combination according to claim 4, wherein said bellows are disposed coaxially with the second bellows surrounding the first bellows and wherein the valve-opening means is constituted by a valve stem connecting said valve to both said bellows.

References Cited in the file of this patent

UNITED STATES PATENTS

| | | |
|---|---|---|
| 2,497,431 | Beman | Feb. 14, 1950 |
| 2,599,507 | Wyckoff | June 3, 1952 |
| 2,638,739 | Barr | May 19, 1953 |
| 2,642,237 | Page et al. | June 16, 1953 |
| 2,677,963 | Mullins et al. | May 11, 1954 |

FOREIGN PATENTS

| | | |
|---|---|---|
| 575,008 | Great Britain | Jan. 30, 1946 |